(12) United States Patent
Tilling et al.

(10) Patent No.: US 9,409,762 B1
(45) Date of Patent: Aug. 9, 2016

(54) LIQUID DELIVERY NOZZLE

(71) Applicant: SCHULTZ ENGINEERED PRODUCTS, INC., Asbury, NJ (US)

(72) Inventors: Basil B. Tilling, Stanley, NC (US); Robert L Schultz, Jr., Ocean, NJ (US); Alexander G. Murashko, Jr., Oakhurst, NJ (US)

(73) Assignee: SCHULTZ ENGINEERED PRODUCTS, INC., Oakhurst, NJ (US)

( * ) Notice: Subject to any disclaimer, the term of this patent is extended or adjusted under 35 U.S.C. 154(b) by 0 days.

(21) Appl. No.: 14/756,064

(22) Filed: Jul. 27, 2015

Related U.S. Application Data

(60) Provisional application No. 61/999,515, filed on Jul. 30, 2014.

(51) Int. Cl.
*B67D 7/42* (2010.01)
*B64F 1/28* (2006.01)

(52) U.S. Cl.
CPC .... *B67D 7/42* (2013.01); *B64F 1/28* (2013.01)

(58) Field of Classification Search
CPC .................................... B64F 1/28; B67D 7/42
USPC .......................... 141/206–226, 392, 301–308
See application file for complete search history.

(56) References Cited

U.S. PATENT DOCUMENTS

| | | | | |
|---|---|---|---|---|
| 2,649,109 A | * | 8/1953 | Samiran | B67D 7/44 137/461 |
| 3,101,101 A | * | 8/1963 | Gearhart | B67D 7/54 141/207 |
| 3,102,555 A | * | 9/1963 | Botkin | B67D 7/48 137/630.15 |
| 3,118,475 A | * | 1/1964 | Hammond | B67D 7/54 141/128 |
| 4,523,700 A | * | 6/1985 | Bower | B67D 7/42 222/505 |
| 7,588,060 B2 | * | 9/2009 | Ballard | B67D 7/44 141/192 |

FOREIGN PATENT DOCUMENTS

AU    WO 8801601 A1 *  3/1988   ............... B67D 7/42

* cited by examiner

*Primary Examiner* — Mark A Laurenzi
*Assistant Examiner* — Timothy P Kelly
(74) *Attorney, Agent, or Firm* — Chris Whewell

(57) ABSTRACT

Provided are nozzles useful for controllably transferring any fluid including without limitation liquids such as hydrocarbon fuels from a first reservoir to a second reservoir. Dispensing nozzles as provided herein have several advantages, including increased control by the technician who is transferring the fluids over the nozzle itself by virtue of greater physical control and less operator fatigue. In addition, a small amount of force applied to the dispensing lever results in a relatively large opening of the control valve mechanism. Further, when line pressure is zero or near zero, it is not possible for un-metered fluid leakage to occur, which provides cost advantages to large volume vendors of liquids such as hydrocarbon fuels which are dispensed on a routine basis, such as at airports. Safety is also greatly enhanced, since latent quantities of fuel cannot flow out from lines equipped with the nozzles provided when supply lines are not pressurized.

10 Claims, 11 Drawing Sheets

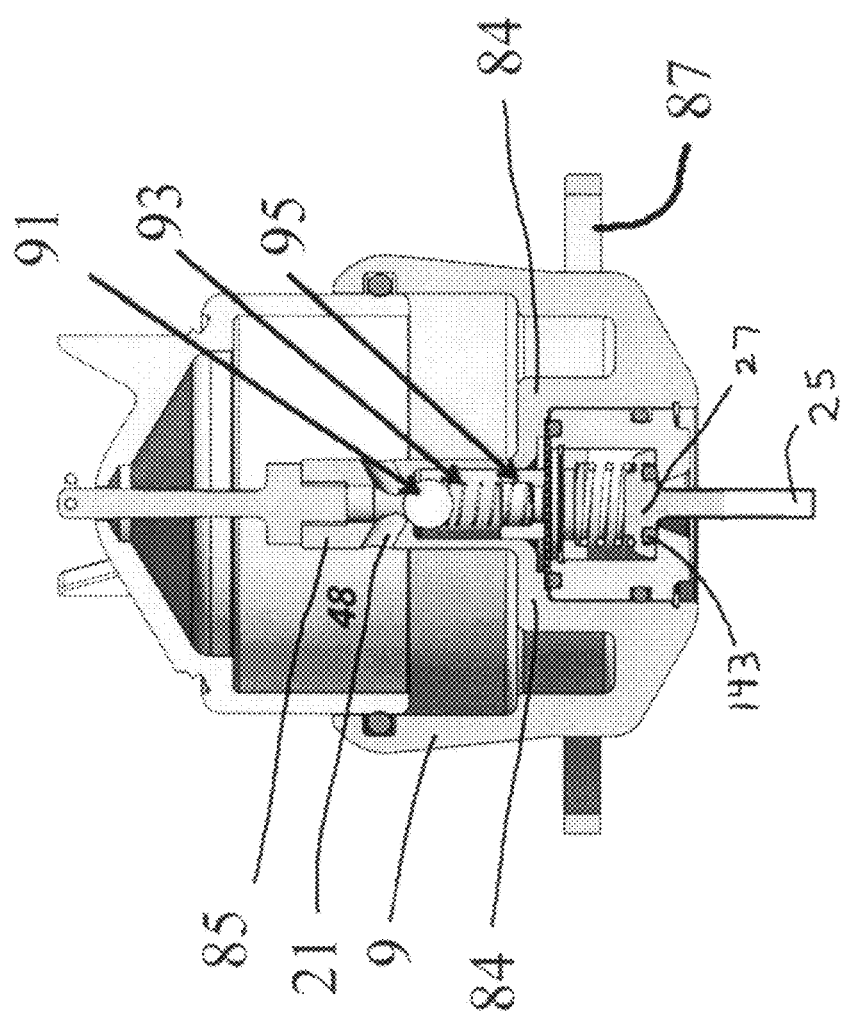

LIQUID DELIVERY NOZZLE

CROSS REFERENCE TO RELATED APPLICATIONS

This application claims the benefit of U.S. Provisional Application No. 61/999,515 filed on Jul. 30, 2014, the entire contents of which are hereby incorporated herein by reference.

TECHNICAL FIELD

This invention relates generally to fluid control, and more particularly it relates to transfer and delivery of liquid substances from one location to another.

BACKGROUND OF THE INVENTION

The statements in this background section merely provide background information related to the present disclosure and may not constitute prior art.

Many fluids are used industrially, including water, steam, brines, oils, lubricants, motor gasolines, jet fuel, aviation fuel, diesel fuel, kerosene, heating oils, industrial chemicals, and gases. Over time in the art of transferring fluid substances, many different dispensing nozzles, valves and associated wares have been developed. These include fueling nozzles used by consumers to re-fuel automobiles, as well as similar nozzles employed on heavier equipment, aircraft refueling, etc. Of such devices available in the prior art marketplace, it is to be expected that of the delivery nozzle products offered there will be at least some disadvantages and shortcomings.

In the case of fueling nozzles employed in re-fueling of aircraft having a fuel tank opening located on the top of a wing of the aircraft, traditional overwing refueling requires either the re-fueling technician's elbow to be uncomfortably maintained in a position above the fueling nozzle, or for the re-fueling technician to otherwise have an awkward or uncomfortable grip on the handle of the conventional overwing fueling nozzle. In many instances, re-fueling technicians choose to climb a ladder, which inherently adds to potential hazards during an aircraft re-fueling operation.

Referring to the drawings, in particular FIG. 1A, there is shown a side cutaway view of a fueling nozzle 2 of a type commonly found in the prior art, featuring a fluid entry 63' at which fuel is supplied from a remote reservoir via a conduit (not shown). A technician refueling a motorized vehicle such as an aircraft typically grasps handle 6' of prior art fueling nozzle 2, places the outlet end 83 inside a fuel tank opening, and pulls dispensing lever 29' with the fingers of the hand holding handle 6', to dispense fuel into the fuel tank. Outlet end 83 is fitted with an annular locator flange 79 designed to keep the nozzle in a relatively stable position during the refueling operation, and a splash flange 77 to prevent fuel from spattering about during the refueling operation. Once admitted to fuel entry 63', the fuel passes through handle conduit 75 and into a valve body comprising a piston 7' having an interior 48' slidably disposed within a bore space 51'. Pulling dispensing lever 29' draws piston 7' back towards dispensing lever 29', thus opening the passageway for the fuel to continue its travel to outlet end 83 and into the receiving fuel tank. In some prior art embodiments a strainer 67' is provided, as well as a ground connection point 81 for preventing the build up of static charge. In many prior art embodiments, such nozzles 2 are fitted with swivel seals 71 and a check valve 73. In such arrangement, the pressure in the fuel supply line assists the springs 47' in holding the piston 7' closed, the volume behind the piston being pressurized by a small bleed hole from the main fuel supply line. These prior art devices make it very difficult for a refueling technician to pull the piston open, due to the pressure in the fuel supply line, as these prior art nozzles are designed so that the first action of the handle cracks open a plunger that relieves the pressure behind the piston, filling a cavity slowly through a bleed hole, which also empties just as quickly through the bleed hole. When the valve is closed, the interior 48' of piston 7 is already filled because it is always connected to conduit 75 through a bleed hole. It is the fluid in interior 48' which helps to keep piston 7 closed. The first action of the handle cracks open a plunger and relieves fluid and hence pressure from behind piston 7. Once the pressure behind the piston is relieved, it then becomes easier to pull the handle back to move the piston out of the way, permitting fuel to flow through the nozzle, the total amount of flow being controlled by the position of the piston, which is determined by the position of the handle. In FIG. 1B is shown a user 70 employing a prior art fueling nozzle 2 in filling a tank 30 with a liquid fuel, wherein tank 30 is an on-board aircraft fuel tank. From FIG. 1B it is evident the user's elbow 36 must be elevated differently from their other limb, causing asymmetry and hence instability about their body during a re-fueling operation, in addition to stressing the muscles of the arms, shoulders and lower back, joints and musculature, which can over time lead to medical disabilities, carpal tunnel-like syndromes due to repeated asymmetrical stress.

SUMMARY OF THE INVENTION

Provided herein are devices useful for dispensing and regulating a fluid substance from a first storage reservoir to a second storage reservoir. A device according to some embodiments comprises a main housing which in some embodiments has an upper housing portion and a lower housing portion. There is a fluid inlet passage configured to be connected to a source of fluid substance from the first reservoir, present at the upper portion of the main housing. There is a fluid exit passage through which the fluid substance exits the device upon its being dispensed to its destination. A bore housing is attached to the main housing and is present between the fluid inlet passage and the fluid exit, the bore housing includes a bore. There is a central tower having a proximal end, a distal end, an outer wall, and a length dimension. The central tower is centrally-disposed on or at the bore housing at its proximal end, and the central tower further comprises a passage extending therethrough that runs parallel to its length dimension. This passage has a proximal end and a distal end. There is further at least one port passing through the outer wall, which is in fluid communication with the passage. There is a tilt valve having a head and a shank, with the shank having a first end proximal to its head, and a second end distal thereto. The head is sealingly engaged over the proximal end of the passage. There is a needle valve disposed over the distal end of the central tower, the needle valve has a length dimension that runs parallel to the length dimension of the central tower. A piston is present slidably disposed within the bore of the bore housing, the piston having a top portion and a bottom portion, and the top portion of the piston comprises an orifice centrally-located therethrough, the orifice being dimensioned sufficiently to enable the needle valve to pass therethrough. A dispensing lever is pivotally connected to the main housing, and there is an actuator lever having a first end and a second end. The first end of the actuator lever is pivotally connected to the dispensing lever, and the second end of the actuator lever is in mechanical contact with the second end of the shank of the tilt valve.

BRIEF DESCRIPTION OF THE DRAWINGS

The drawings shown and described herein are provided for illustration purposes only and are merely exemplary of different embodiments provided herein, not intended to be construed in any delimitive fashion.

FIG. 8 is a side cutaway view of components present in a fluid delivery control device according to some embodiments of the disclosure, illustrating a check-valve subassembly.

DETAILED DESCRIPTION

The following description is merely exemplary in nature and is in no way intended to limit the present disclosure, application, or uses.

Figure 2A:
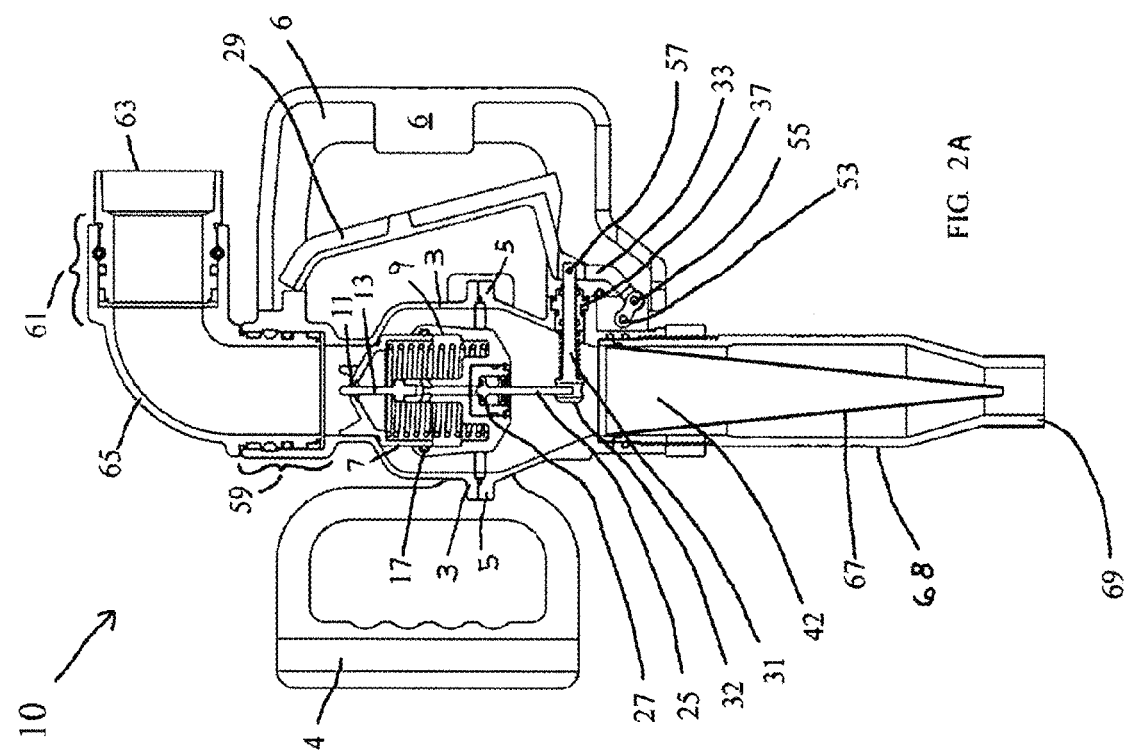
FIG. 2A is a side cutaway view of a fluid delivery control device according to some embodiments of this disclosure.

Referring now to FIG. 2A, there is shown a side cutaway view of a fueling nozzle 10 according to some embodiments of this disclosure, configured to enable a person to dispense fuel to a fuel-receiving tank, including without limitation such tanks present on motorized vehicles, including aircraft. Fueling nozzle 10 enables its user to easily selectively commence and cease flow of a liquid fuel being charged to the vehicle's on-board fuel tank. Fueling nozzle 10 features a fluid entry 63 which is configured to receive and sealingly-engage conventional hardware disposed at a first end of a hose or other conduit, whose second end is connected to a reservoir or tank, etc. that contains a source fuel that is to be transferred to the aircraft's on-board fuel tank.

Fueling nozzle 10 also features a delivery end 69 at which fuel exits fueling nozzle 10 into a selected receiving tank, such as an on-board fuel tank of a motorized vehicle. During use of fueling nozzle 10, the technician grasps handles 4, 6 with the right and left hands, or vice versa depending on the handedness of the individual. After insertion of delivery end 69 into a receiving tank, the technician grasps dispensing lever 29 with the fingers of the hand. To initiate the flow of fuel from conduit 65 to delivery end 69, the technician pulls dispensing lever 29 in a direction towards the right in FIG. 2A.

FIG. 2A also shows the respective locations of various components of fueling nozzle 10. Conduit 65 in some embodiments features a bend or angle while in other embodiments conduit 65 is linear. When bent or angled, the first and second end portions of conduit 65 are provided with swing couplings 59, 61 which enable 360-degree rotation of a hose or conduit attached to fueling nozzle 10 at fluid entry 63, as well as 360-degree rotation of conduit 65 with respect to the remainder of fueling nozzle 10 at 59. Swing couplings 59, 61 feature o-rings or other known, like seals to maintain a seal between ambient surroundings and the interior of conduit 65. Thus, in a nozzle according to some embodiments the fluid inlet passage comprises a conduit that is rotatable in two dimensions. Swing couplings such as these are available from Schultz Engineered Products Inc. of Neptune, N.J.

In some embodiments an integral valve assembly is provided within fueling nozzle 10, featuring upper housing 3, lower housing 5, piston 7, bore housing 9, needle valve orifice 11, needle valve 13, seal 17, and tilt valve 27. Upper housing 3 and lower housing 5 may be collectively considered as being a main housing. In some embodiments there is a fluid exit 42 passage, strainer 67, tilt valve shank 25, activator shaft 31 that moves axially and has an end 32, and dispensing lever 29 having end 33. In some embodiments strainer is shrouded by outer conduit 68, which is a tube that also acts as a guide when inserted into the receiving bung or opening of a receiving vessel such as an on-board fuel tank. Activator shaft 31 is provided with a bushing 37 disposed thereabout, to guide activator shaft 31 and to seal the liquid/fuel passing through fueling nozzle 10 from the ambient surroundings. End 33 of dispensing lever 29 is pivotally connected at 55 to a first portion of link 35 (FIG. 3A), whose second portion is pivotally connected at 53 to stationary location 41 (FIG. 3A) present on the external portion of lower housing 5. Such an arrangement in further combination with pivotal attachment of activator shaft 31 to dispensing lever 29 at 57, and with the end of tilt valve shank 25 being engaged with end 32 of activator shaft 31, provides that when such user pulls dispensing lever 29 in a direction towards the right, the sealing surface of tilt valve 27 is caused to become tilted with respect to its orientation of FIG. 2A and thus disengaged from, or lifted partially off of, its seat or seal 43 (FIG. 4).

Figure 2B:
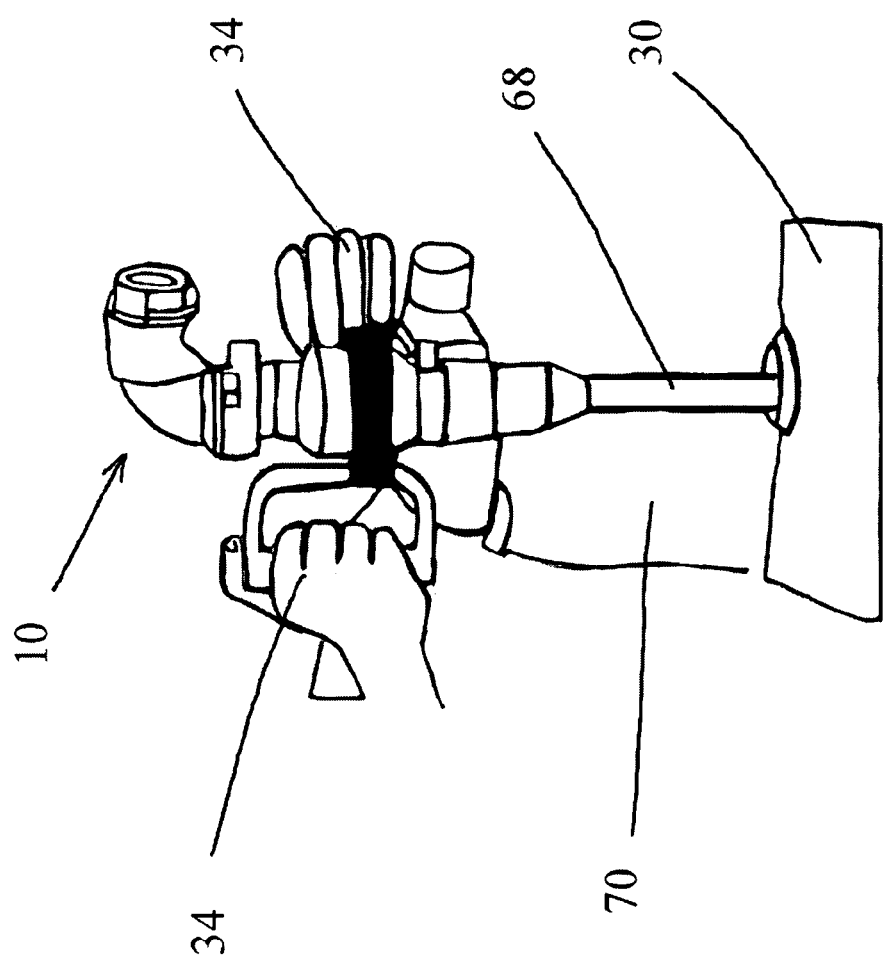
FIG. 2B is a perspective view of a user employing a fluid delivery control device according to some embodiments of this disclosure in a liquid transfer operation.

In FIG. 2B is shown a user 70 employing a fueling nozzle 10 according to some embodiments of this disclosure in filling a tank 30 with a liquid fuel, wherein tank 30 is an on-board aircraft fuel tank. FIG. 2B shows the user's hands 34 being evenly employed about fueling nozzle 10 resulting in bodily symmetry that not only eliminates bodily stresses on arms, shoulders and the lower back, joints and musculature, but also simultaneously provides for increased physical control over the fueling nozzle 10 as a whole while affording superior fluid control, by only the grasping action of the fingers on one hand. Thus, some embodiments provide for simultaneous superior physical control of the fueling nozzle 10 during a re-fueling operation with attendant reduced bodily stress, while additionally providing smoother operation and greater flow control during refueling, for reasons detailed below concerning the operation of the valving mechanism contained within fueling nozzle 10.

It may appear from the drawings herein at first glance that the piston of this disclosure is disposed so that the pressure in the fuel line would push the piston open; however, this is not the case because piston 7 is an overbalanced piston, with the area on the upstream side of the piston being less than the area on the downstream side of the piston. Such feature in combination with other features as described herein including spring 47 (FIG. 4) and the dimensions of elements present as a whole result in the situation that when a fueling nozzle 10 according to this disclosure is closed and the fuel supply line is pressurized, there is a greater net force on the downstream side of the piston than on the upstream side of the piston, which maintains the piston in a closed position, preventing the flow of fuel therethrough. Thus, fueling nozzle 10 effectively includes a pilot-operated control valve, having a piston whose movement regulates the amount of fuel that is able to pass through fueling nozzle 10. The piston is to some degree spring-biased towards a closed position that blocks the flow of fuel through fueling nozzle 10 by the presence of spring 47 (FIG. 4), however, but it is generally true for some embodiments that the greater the pressure in the fuel supply line, the more the piston 7 is forced towards a closed position.

Figure 3A:
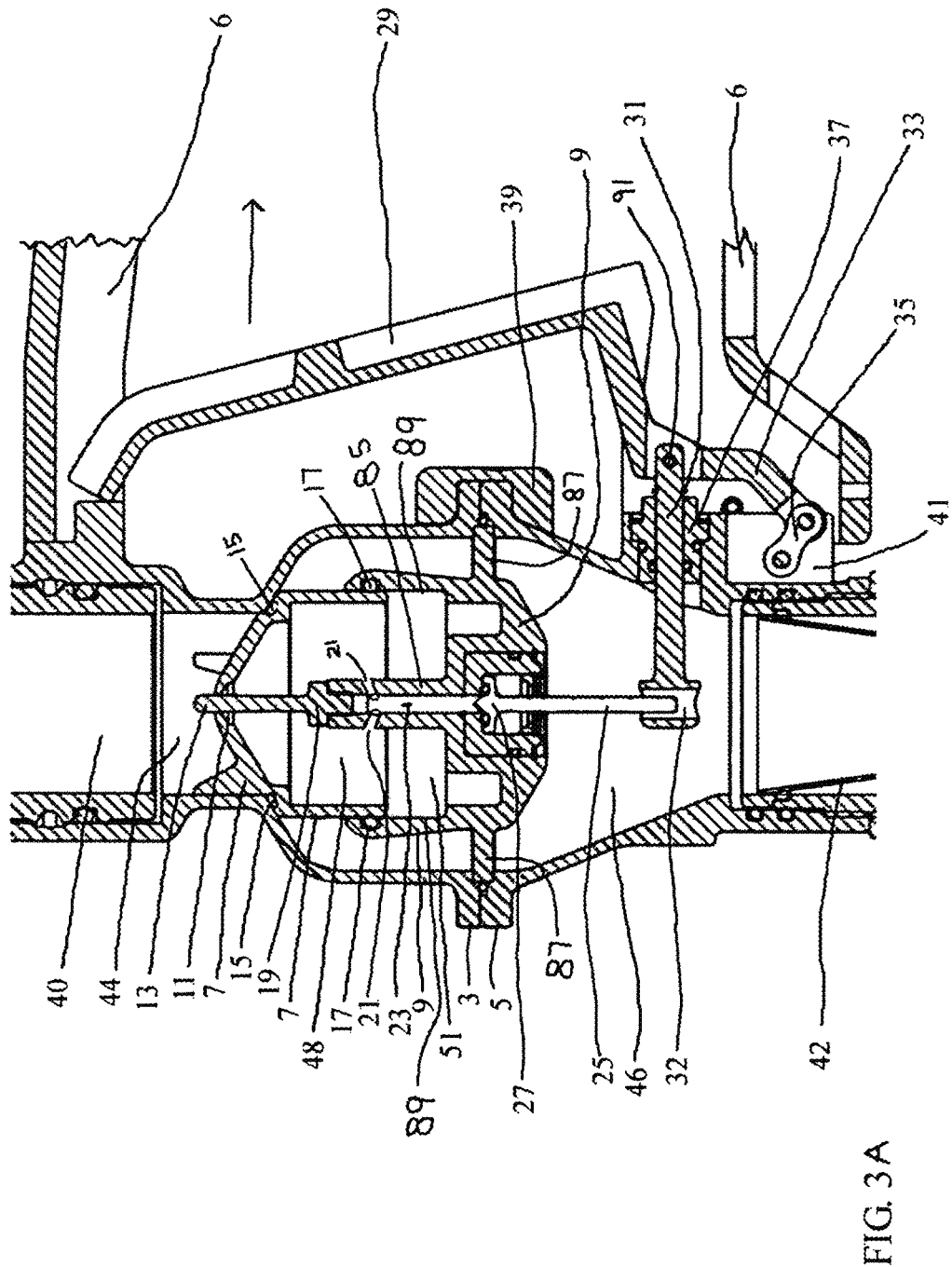
FIG. 3A is a close-up of a side cutaway view of components present in a fluid delivery control device according to some embodiments of this disclosure.
Figure 4:
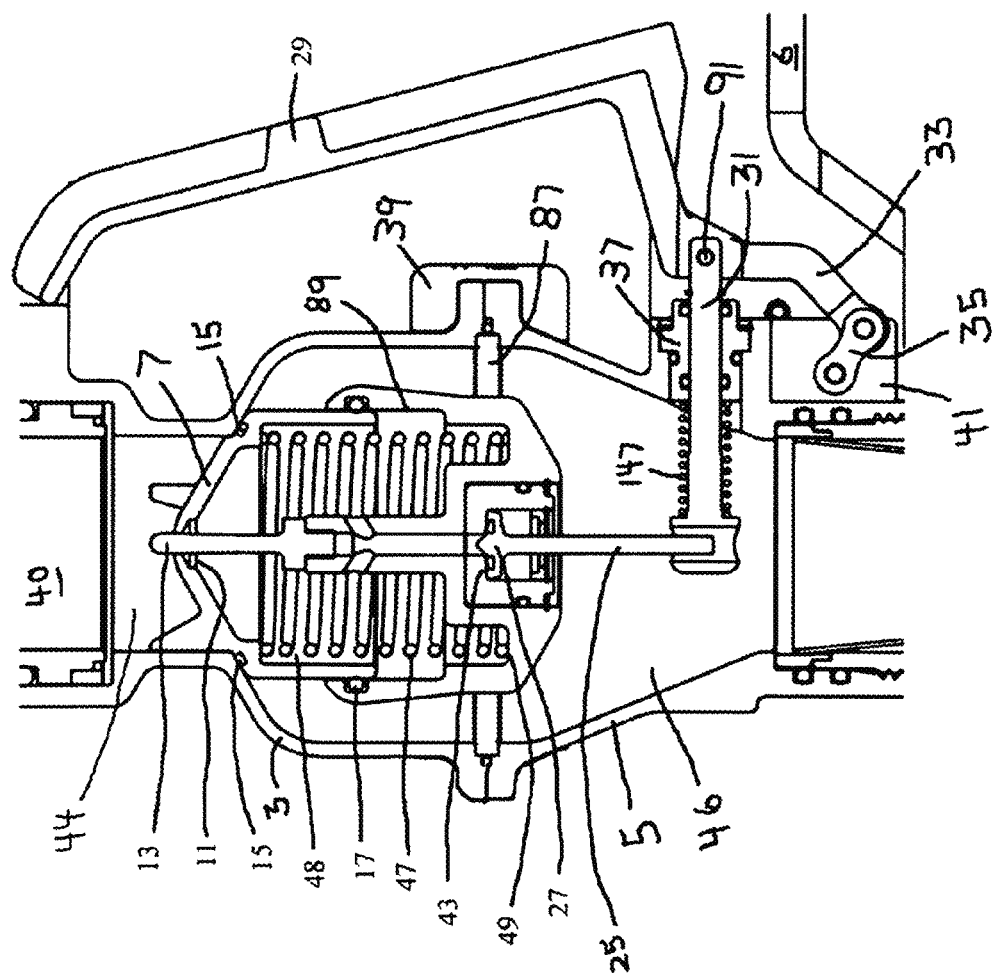
FIG. 4 is a close-up of a side cutaway view of components present in a fluid delivery control device according to some embodiments of this disclosure in a closed position.

FIG. 3A is a close-up of a side cutaway view of components and features present in a fluid delivery control device according to some embodiments of the disclosure. In FIG. 3A is shown fluid entry passage 40 within conduit 65 (FIG. 2A) which is adjacent to upstream space 44. Piston 7 is shown in its rest position, having needle valve orifice 11 at its top end that is configured to receive and slidingly engage needle valve 13. In some embodiments both needle valve 13 and needle valve orifice 11 are circular in their cross-sectional dimension; however, any other cross-sectional dimensions of these elements are suitable for use in a fueling nozzle 10 according to this disclosure provided the same function as described herein is achieved. In general the cross-sectional dimension of needle valve 13 is smaller than the cross sectional dimension of needle valve orifice 11 sufficiently to enable flow of fuel present in fluid entry passage 40, present in upstream space 44, into the interior volume 48 of piston 7. Thus, a gap exists in some embodiments between needle valve orifice 11 and needle valve 13, having any effective dimension suitable to enable for the function described herein. In some non-limiting, exemplary embodiments this gap is any gap having any selected cross-sectional area between two and three square millimeters, including all gaps and ranges of gaps therebetween. In some embodiments, this gap is donut-shaped.

Piston 7 is slidably disposed in a bore 89, which bore 89 is in some embodiments contained within and in, other embodiments an integral part of, bore housing 9. Piston 7 is fitted with a seal 15 at its upper shoulder, seal 15 extending coextensively about the upper shoulder of piston 7 sufficient to create a sealing arrangement between the upper shoulder of piston 7 and the inner wall of upper housing 3 where seal 15 contacts upper housing 3 when fueling nozzle 10 is in a state of non-use.

Bore housing 9 is attached to upper housing 3 and lower housing 5 by supports 87 attached to both the bore housing and at least one of upper housing 3 and lower housing 5. Supports 87 are in some embodiments configured to permit flow of liquid from the space above them, to the space beneath them as indicated by the arrows in FIGS. 5, 6. In some embodiments supports 87 are part of bore housing 9 and are sandwiched inbetween upper housing 3 and lower housing 5, which also aligns upper housing 3, lower housing 5, and bore housing 9 axially with one another. In some embodiments upper housing 3 and lower housing 5 are separate elements, each having a mating lip and joined as shown and held together by a securement 39, which in some embodiments is a clamp and in other embodiments a clamping collar. In some embodiments upper housing 3 and lower housing 5 can be permanently affixed to one another, such as by welding. In some embodiments, upper housing 3 and lower housing 5 are bolted together, and securement 39 functions as a wear ring or guard to protect the flanges present on upper housing 3 and lower housing 5.

Bore housing 9 includes a bore 89 within which piston 7 is slidably disposed. Bore housing 9 in some embodiments includes a seal 17 which can be an o-ring or like seal that runs coextensively about piston 7. Bore housing 9 includes a central tower 85. Central tower 85 has an upper portion and a lower portion, with the upper portion being configured to receive and maintain the end base 19 of needle valve 11 in a stationary position. Central tower 85 includes a passage 23 disposed through its interior, which passage 23 runs all the way through the lower portion of central tower 85, terminating at a planar surface having a seal 43 (FIG. 4) disposed thereabout that is configured to sealingly engage with the face of tilt valve 27. In some embodiments, seal 43 is disposed on the surface of or embedded within tilt valve 27 as selected, and seal 43 moves with movement of tilt valve 27. Present along the length of passage 23 are provided ports 21, which provide a fluid communication passageway that permits the passage of liquid fuel from piston inner volume 48 or bore space 51 into passage 23, responsive to movement of tilt valve 27 off of its seat 43 (FIG. 4) such as by deflection of tilt valve shank 25 as a result of movement of actuator lever end 32.

Dispensing lever 29 is shown in FIG. 3A, having an end 33 that is pivotally connected to one end of link 35, the other end of link 35 being pivotally connected to a stationary location 41 on body 5. Activator shaft 31 is also pivotally connected at 91, at its first end to dispensing lever 29, the second end of dispensing lever being in effective mechanical contact with tilt valve shank 25. In some embodiments the end of activator shaft 31 which actuates tilt valve shank 25 contains a tubular section that extends about the end of tilt valve shank 25, as shown.

In FIG. 4 is shown a close-up of a side cutaway view of components present in a fluid delivery control device according to some embodiments of the disclosure in a closed position, depicting the location of spring 47 which was omitted from the description of FIG. 3A for reasons of, clarity of other components present. Spring 47 has a first end which resides in a spring seat 49 present in bore housing 9, and the second end of spring 47 is disposed sufficiently to mechanically bias piston 7 towards a closed position such that seal 15 present at or on the shoulder of piston 7 engages the inner wall of upper housing 3 to prevent fuel being dispensed from passing from upstream space 44, (space that is upstream to the location at which valving is effected) to downstream space 46 (space that is downstream to the location at which valving is effected). In alternate embodiments, seal 15 is present in or on the wall of upper housing 3 and sealingly engages the shoulder of piston 7. In some embodiments, the interior contour of piston 7 is configured to receive spring 47 in such a biasing arrangement. In some exemplary, non-limiting embodiments, spring 47 has a diameter of 4.01 centimeters and a free length of 11.43 centimeters. In some exemplary, non-limiting embodiments the installed height of spring 47 is 4.30 centimeters, and spring 47 exerts a force of about 26 Newtons at this height. In some exemplary, non-limiting embodiments, spring 47 has 11 coils and is made from any suitable spring steel having a circular cross-section that is 2.16 millimeters in diameter. Some exemplary, non-limiting embodiments of a fueling nozzle 10 having a spring with the features and gap mentioned above is capable of withstanding a line pressure at fluid entry passage 40 of three pounds per square inch ("psi") without the seal 15 about piston 7 being moved to enable liquid flow past piston 7 to downstream space 46, and the diameter of passage 23 is 3.81 millimeters. When seals are present about the pertinent elements, a stronger closing force of piston 7 results, as line pressure is increased due to piston 7 being overbalanced. Of course such specific dimension of passage 23 and other features specified are merely exemplary of some embodiments of this disclosure, those of ordinary skill in this art once understanding the teachings hereof find it simple to make routine adjustments to parameters and values specified without any undue level or burden of experimentation. A further advantage still of the teachings provided herein is the elimination of a check valve 73 as compared to prior art fueling nozzles, as the necessity of such check valves have been rendered redundant by the function of fueling nozzles of the present disclosure as a whole.

Figure 3B:
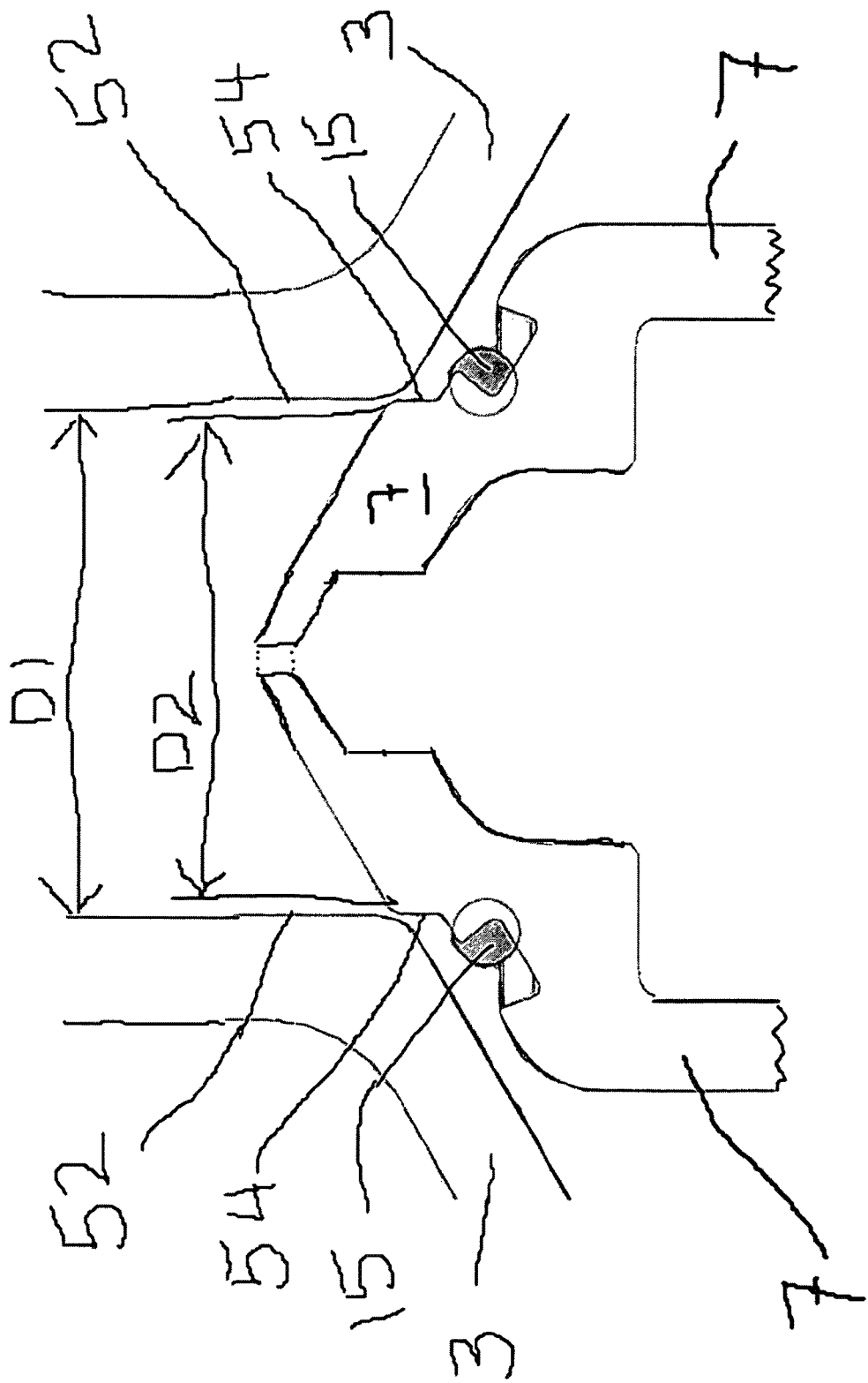
FIG. 3B is a close-up of a side cutaway view of components present in a fluid delivery control device according to some embodiments of this disclosure.

FIG. 3B shows a close-up side cutaway view of components present in a fluid delivery control device according to some embodiments of this disclosure, showing the piston 7, seal 15, upstream space 44, piston interior volume 48, and upper housing 3. Upper housing 3 includes a bore therethrough having wall 52. The bore having wall 52 is of any selected appropriate diameter D1 and in some embodiments piston 7 features a crown having a vertical wall 54 which is circular in configuration from an overhead perspective and has a diameter D2. In some exemplary, non-limiting embodiments, the D2 is dimensioned the be slightly smaller than the diameter D1, by an amount between 0.1 and 0.2 millimeters, which provides for piston 7 choking the flow of liquid passing from upstream space 44 to downstream space 46, prior to the seating of seal 15. In some exemplary embodiments, D1 is 3.87 centimeters, and D2 is 3.86 centimeters. Such feature of piston 7 being contoured to choke off flow of liquid from upstream space 44 to downstream space 46 prior to engagement of seal 15 results in vast reduction of line shock and recoil when it is desired to stop liquid flow, compared to prior art fueling nozzles.

In FIG. 4 is also shown return spring 147 having two ends, the first end being seated against bushing 37 and the second end being seated against actuator lever end 32. Return spring 147 maintains tilt valve shank 25 in the position shown in FIG. 4 when dispensing lever 29 is at its rest position, as shown, thus allowing tilt valve 27 to remain sealed against seal 43 precluding any liquid present in piston interior volume 48 from flowing through ports 21 and out of passage 23 into downstream space 46. The same function is achieved when seal 43 is selected to be present in or on tilt valve 27.

Figure 5:
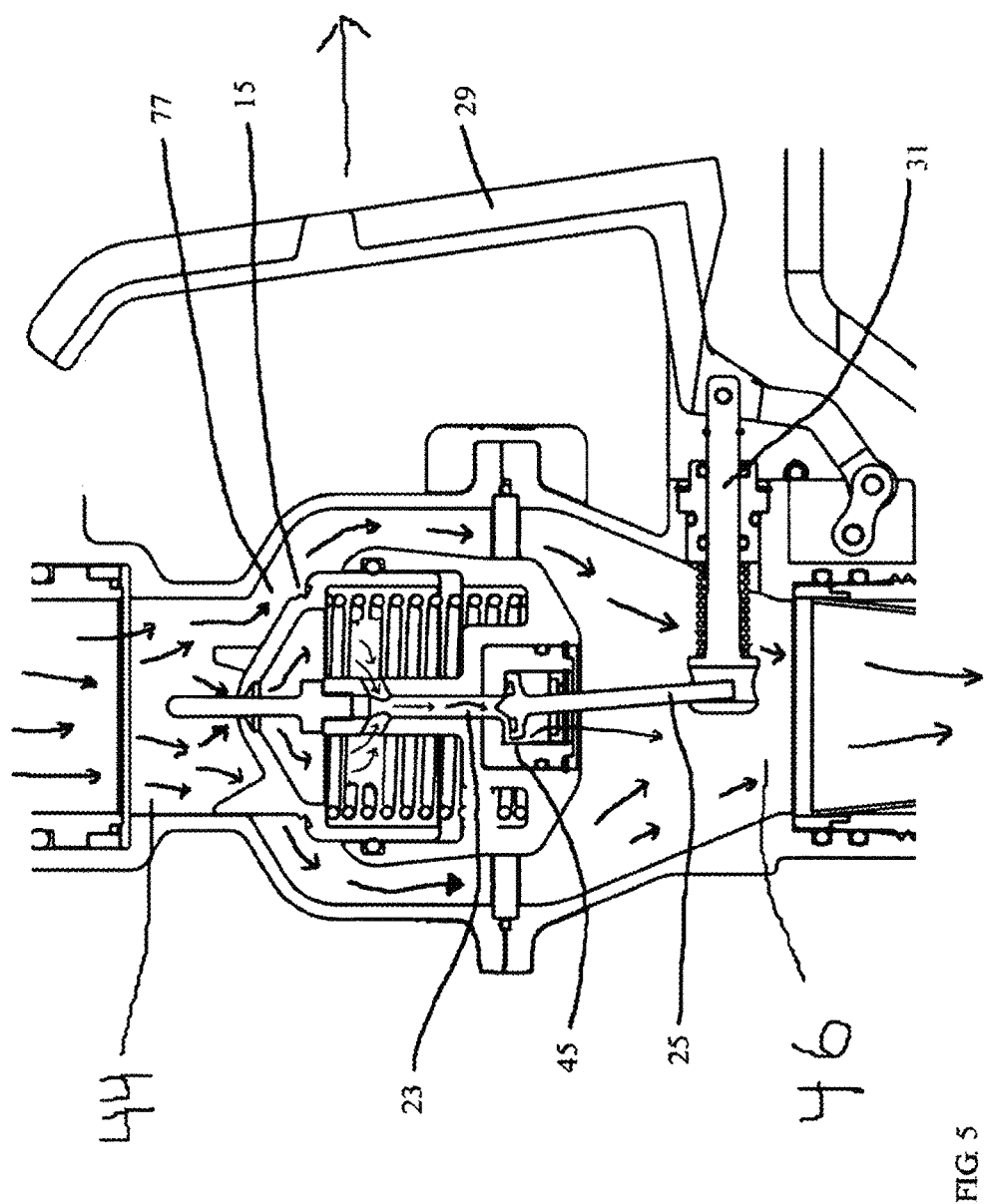
FIG. 5 is a close-up of a side cutaway view of components present in a fluid delivery control device according to some embodiments of this disclosure in a partially-opened position.

FIG. 5 is a close-up of a side cutaway view of components present in a fluid delivery control device according to some embodiments of the disclosure in a partially-opened position, in which liquid fuel is permitted to flow from upstream space 44, past piston 7 through opening 77, to downstream space 46, as indicated by the arrows thereon. As seen in FIG. 5, piston 7 has moved downward with respect to its normally-closed location shown in FIG. 4, due to dispensing lever 29 having been moved to the right as indicated by the arrow, such as by the grasp of a user's fingers. Motion of dispensing lever 29 to the right in FIG. 5 causes activator shaft 31 to pull on tilt valve shank 25, thus moving tilt valve 27 off of seal 43, creating opening 45. The same function is achieved when seal 43 is selected to be present in or on tilt valve 27. Such creation of opening 45 permits liquid fuel present in piston interior volume 48 to flow through ports 21, into passage 23 and finally out of opening 45 and into downstream space 46, thereby reducing the upward force on piston 7, which allows piston 7 to move downward as it seeks to find an equilibrium position of fluid flowing into piston interior volume 48 vs. liquid flowing out of piston interior volume 48, such as to the position shown in FIG. 5. More liquid fuel enters piston interior volume 48 through needle valve orifice 11 (FIG. 4) through the gap between needle valve 13 and needle valve orifice 11. The downward movement of piston 7 continues for each degree of further movement to the right of dispensing lever 29 until dispensing lever 29 is kept in a stationary position, at which point an equilibrium will be reached between the downward force on piston 7 by the line pressure of liquid fuel in upstream space 44 and the upward force on piston 7 by the liquid fuel contained within piston interior volume 48. These pressures are dependent on the line pressure of the liquid fuel, the pre-selected size of the gap between needle valve 13 and needle valve orifice 11, the area on the topside of piston 7 exposed to line pressure in upstream space 44, the area of the interior of piston 7, and the effective liquid pressure present in the interior of piston 7. As piston 7 moves upward or downward, it closes or opens the passageway (opening 77) through which liquid can flow. In view of this disclosure, it is thus a relatively simple matter now to determine any level of force desired to be acting on piston 7 for various dimensions of a device as taught herein to be selected, for any selected degree of line pressure in upstream space 44. In general, the characteristics of spring 47 are selected to that when there is no line pressure at upstream space 44, piston spring 47 maintains piston 7 in the closed position. The presence and configuration of tilt valve 27 results in easy operation of fueling nozzle 10 with minimal grasping force by the user, regardless of the line pressure, and provides extremely smooth throttling of fuel flow.

Figure 6:
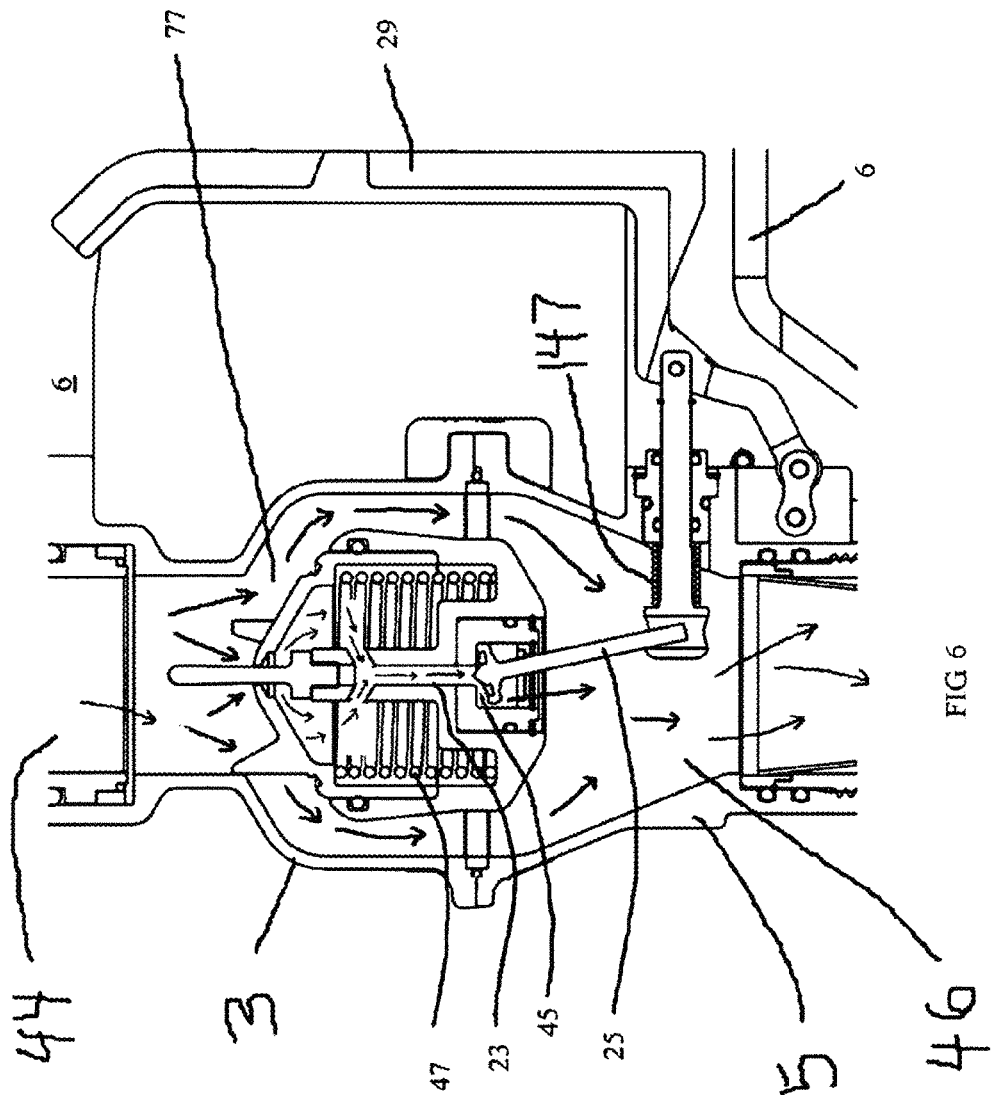
FIG. 6 is a close-up of a side cutaway view of components present in a fluid delivery control device according to some embodiments of this disclosure in a fully-opened position.

FIG. 6 is a close-up of a side cutaway view of components present in a fluid delivery control device according to some embodiments of the disclosure in a fully-opened position, piston 7 having become totally bottomed-out and at the lowermost extreme point of its possible travel, by virtue of the sealing face or other pertinent portion of tilt valve 27 having been either sufficiently or maximally removed away from seal 43, (in alternate embodiments when seal 43 is selected to be present in or on tilt valve 27 being so moved to permit flow through passage 23) and the remainder of fueling nozzle 10 (FIG. 2A) being dimensioned sufficiently that by such action the downward force of liquid or liquid fuel passing from upstream space 44 to downstream space 46 completely overcomes the upward force exerted by spring 47, there being effectively no net upward force within piston interior volume 48 due to near total bleed-off of liquid passing through ports 21 and passage 23. The position of piston 7 in FIG. 6 represents the situation when the valve arrangement within fueling nozzle 10 is "full open" and permits the maximum flow of liquid from upstream space 44 to downstream space 46.

For some degrees of opening of tilt valve 27, the volume of fluid flowing into piston interior volume 48 through needle valve orifice 11 is equal to the volume of fluid flowing out of passage 23 past seal 43 (FIG. 4). As tilt valve 27 is opened further, piston 7 "floats" further down so that the location of needle valve orifice 11 is at a location about the shank of needle valve 13. By contouring the shank of needle valve 13 to be tapered to any selected degree, it is possible to control the location of piston 7 in fueling nozzle 10 for any degree or amount of opening of tilt valve 27 selected by engineers.

Figure 7:
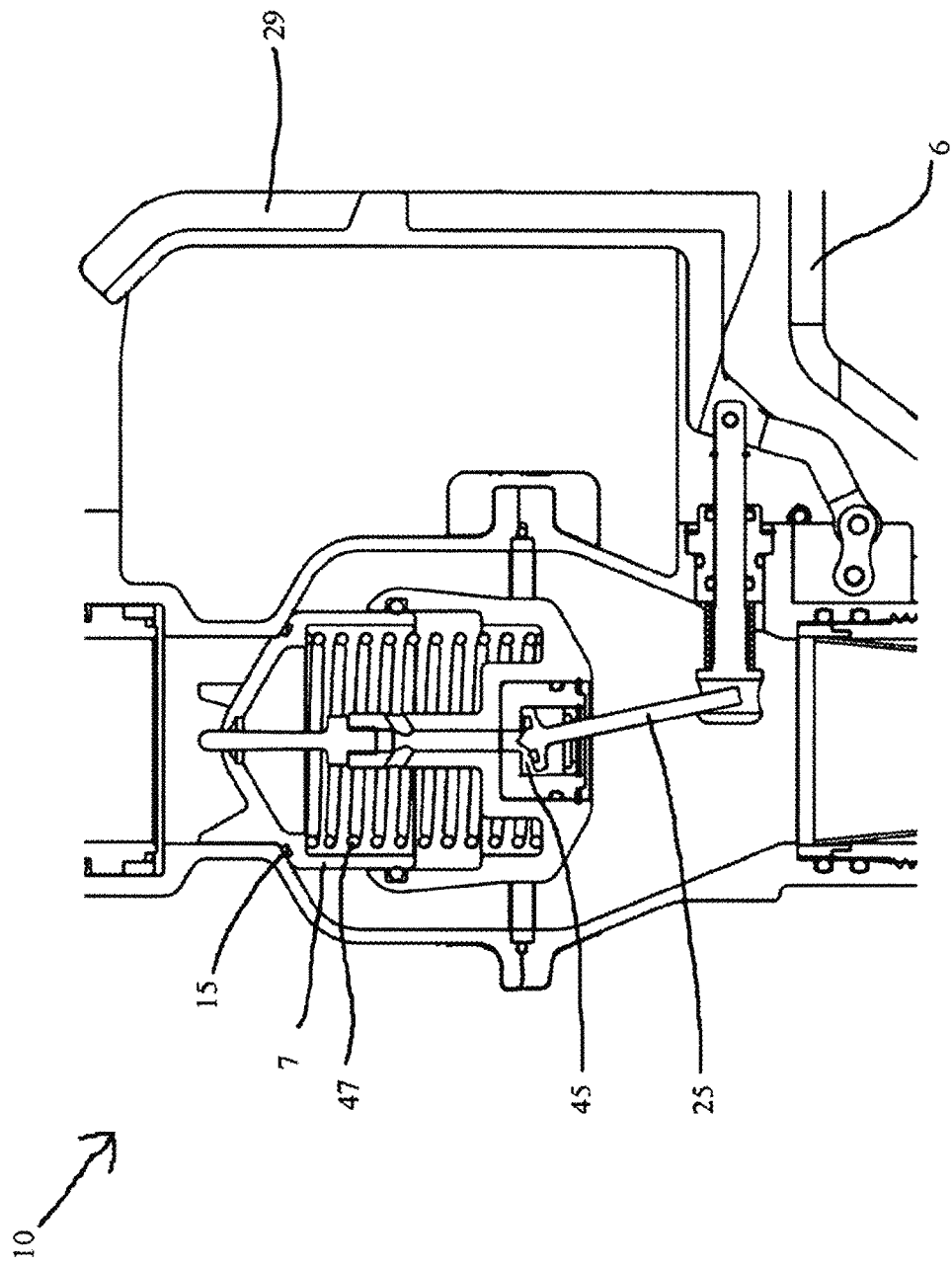
FIG. 7 is a close-up of a side cutaway view of components present in a fluid delivery control device according to some embodiments of this disclosure in a closed position.

In addition to the several functions, features, and synergies provided herein, another valuable feature of a nozzle 10 according to this disclosure is, when there is no line pressure, i.e., the pump supplying fuel or other selected liquid under pressure to nozzle 10 is not operating, piston 7 is spring-biased in a closed position and can accordingly not open to permit latent fuel or other liquid in the conduit supplying nozzle 10 to flow onto pavement or the ambient surroundings. In addition, upon initial opening of piston 7 during a refueling operation, as depicted in FIG. 7, only a tiny amount of fuel escapes from passage 23 prior to commencement of flow of liquid fuel from upstream space 44 to downstream space 46, typically about ten milliliters. This amount is not significant enough to cause draining of liquid fuel from the supply hose attached at fluid entry 63 (FIG. 2A) since piston 7 remains in a closed position with seal 15 engaged. When using prior art devices, a significant amount of fuel in the line was lost, and un-metered, which translates to lost revenues for the fuel providers dealing in large volumes, such as providers who re-fuel commercial aircraft. Thus, the present invention solves a long-standing issue in the art of refueling, whereby oil companies using prior art devices were not able to collect revenue for all fuel consumed.

FIG. 8 is a side cutaway view of components present in a fluid delivery control device according to some embodiments of the disclosure, illustrating a pressure-maintaining valve subassembly comprising ball 91, spring 93, and bushing 95. Spring 93 and ball 91 are disposed within passage 23 of tower 85 sufficiently so that ball 91 is mechanically-biased towards blocking the opening of port(s) 21. Bushing 95 rests on or in proximity to base 84 of tower 85 and serves as a spring seat to provide stability for the stationary end of spring 93. The non-stationary end of spring 93 is disposed to be in contact with ball 91, there maintaining a mechanical bias on ball 91 when ball 91 is pressed against the top of passage 23 within tower 85. In some exemplary, non-limiting embodiments, spring 93 is selected so that the pressure present in port(s) 21 exceeds ambient pressure by about 6.6 pounds per square inch in order to cause motion of ball 91 to compresses spring, 93 thus opening port(s) 21. In other embodiments spring 93 is selectable by engineers depending on end-use requirements, so that the pressure present in port(s) 21 must exceed ambient pressure by any desired amount between one pound per square inch and 100 pounds per square inch, or any pre-selected pressure, in order to cause motion of ball 91 to compresses spring, 93 thus opening port(s) 21 under sufficient pressure.

Thus ball 91, spring 93, and bushing 95 when collectively selected to be present as described herein permits fluid to flow from port(s) 21 into passage 23, but not vice versa. In some field end-uses, when there is a very low pressure in the supply line attached to a fueling nozzle 10, if tilt valve 27 is actuated, fuel can slowly make its way out of the tilt valve. Addition of a pressure-maintaining valve as herein described will increase the amount of pressure required before fuel is permitted to flow from port(s) 21 into passage 23, thus permitting custom tuning of the performance of a fueling nozzle 10. Thus, with appropriate selection of spring 93, a system can be readily provided in which fueling nozzle 10 will not dispense any fuel at all, unless the pressure in the fuel supply line to nozzle 10 is at least that of any pre-selected threshold value based on the stiffness of spring 93. Ball 91 also functions in some embodiments to prevent air entering piston interior volume 48. As mentioned above, in some field end-uses, when there is a very low pressure in the supply line attached to a fueling nozzle 10, if tilt valve 27 is actuated, fuel can slowly make its way out of the tilt valve. Simultaneously, however, air can also be admitted into piston interior volume 48, which can lead to a leakage scenario. One instance could be when an operator brings the supply line pressure to a fuel nozzle 10 up to operating pressure very quickly, the surge in the line pressure causes an impact force which can act on the top of piston 7. With substantial air or other gas present in piston interior volume 48, the air present therein is compressed upon such impact force, and piston 7 can momentarily move, permitting fuel to momentarily pass through opening 77 (FIG. 6). Any other known or prior art check valve subassembly that is apparently suitable for use in a nozzle 10 as provided herein may be selected and employed.

FIG. 8 also illustrates an alternative embodiment having the rear face of tilt valve 27 equipped with a seal 143 and being spring-biased towards a closed position. The present disclosure includes further alternate embodiments when such a configuration of tilt valve as shown in FIG. 8 is employed, that ball 91 and spring 93 are omitted.

Figure 1A:
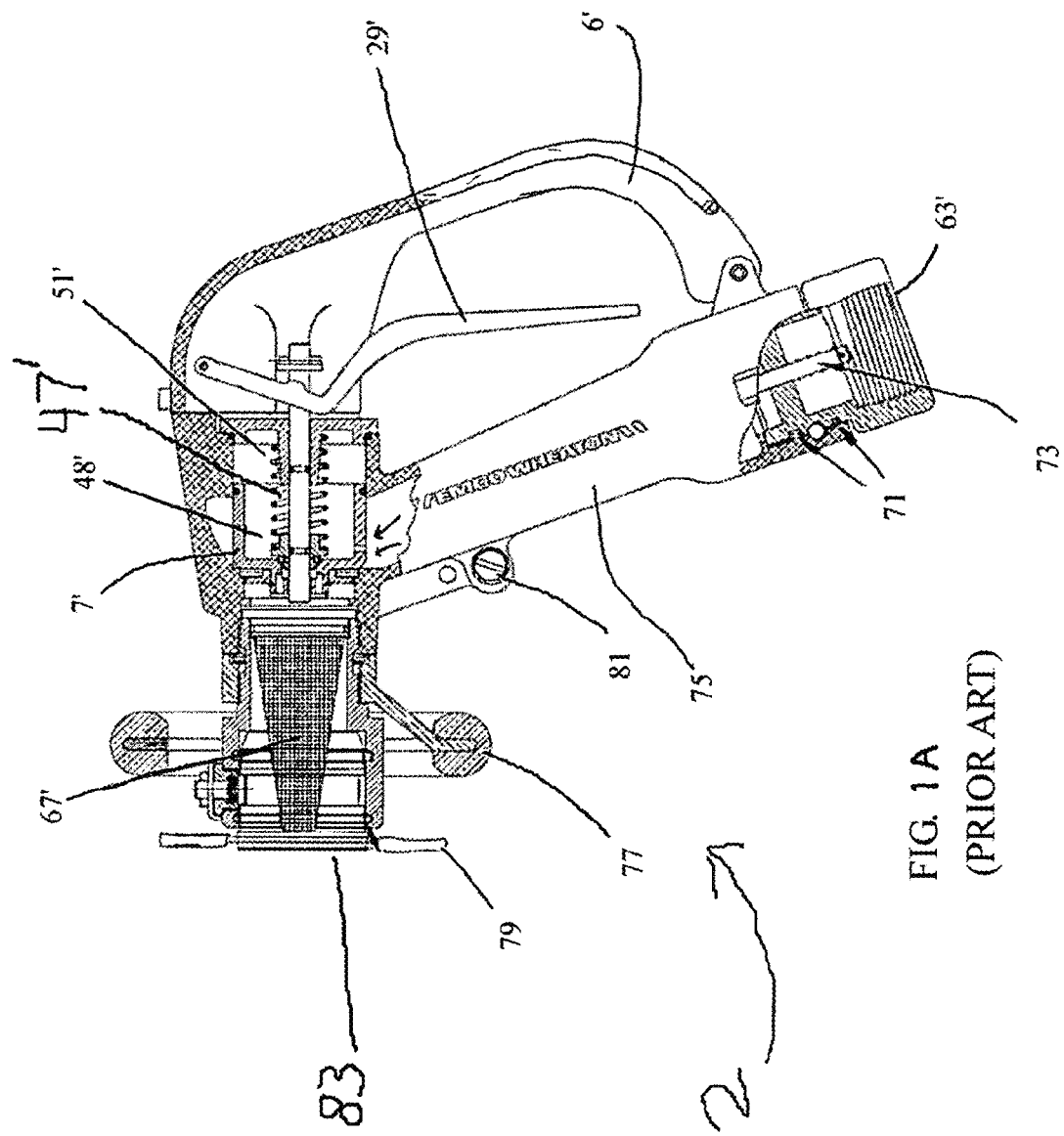
FIG. 1A is a side cutaway view of a prior art fluid delivery control device.
Figure 1B:
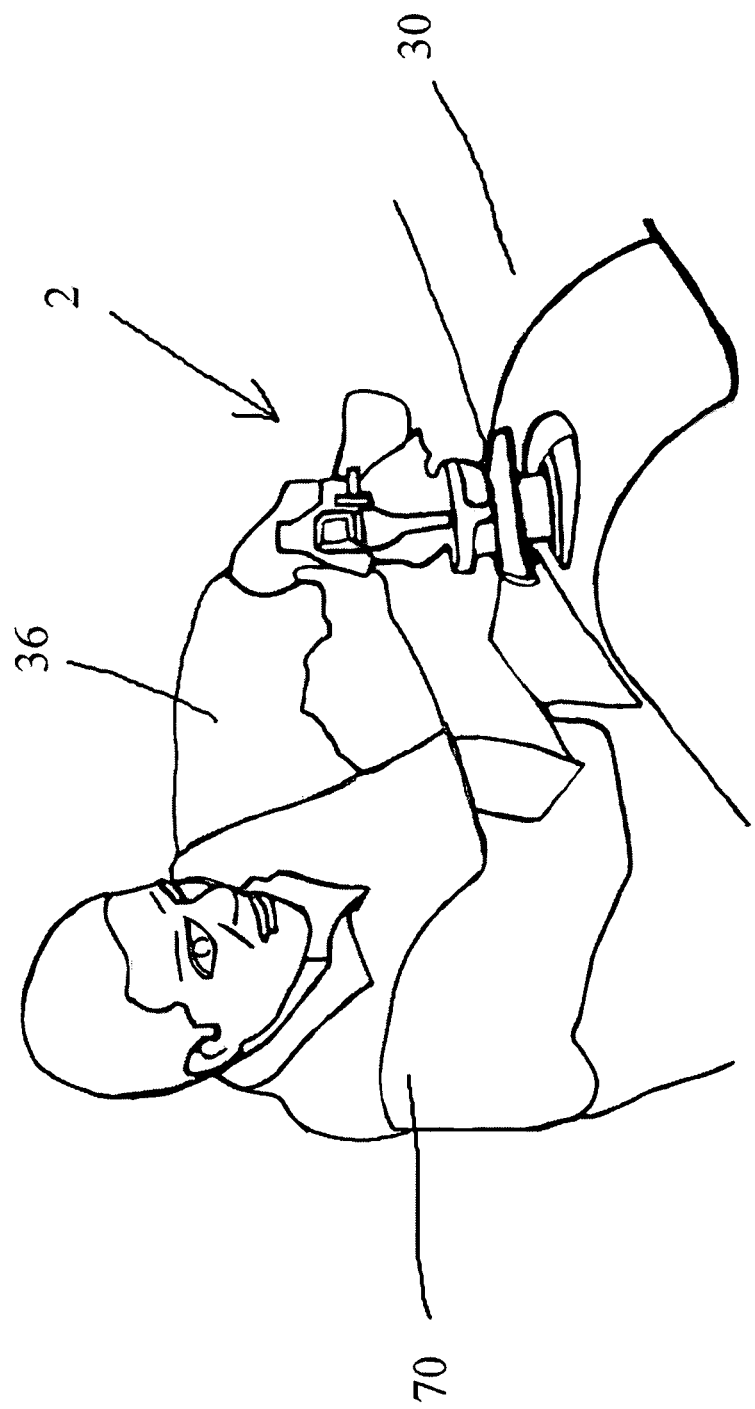
FIG. 1B is a perspective view of a user employing a prior art fluid delivery control device in a liquid transfer operation.

In some embodiments both of said fluid entry passage 40 and fluid exit passage 42 are conduits each having a circular cross section and a center. In some embodiments the centers of each of said fluid inlet passage and said fluid exit passage are substantially aligned with one another. Such configuration makes a nozzle 10 according to this disclosure to be useful by a re-fueling technician or other personnel in an orientation such as that shown in FIG. 2B, as opposed to fueling nozzles of prior art which are only useful as shown in FIG. 1B.

Consideration must be given to the fact that although this invention has been described and disclosed in relation to certain embodiments, equivalent modifications and alterations thereof may become apparent to persons of ordinary skill in this art after reading and understanding this specification. The present disclosure includes subject matter defined by any combinations of any one or more of the features provided in this disclosure with any one or more of any other features provided in this disclosure. These combinations include the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. These combinations also include combination of the features and/or limitations of one or more of the independent claims with features and/or limitations of another independent claims to arrive at a modified independent claim, with the remaining dependent claims in their original text or as modified per the foregoing, being read and applied to any independent claim so modified.

What is claimed is:

1. An apparatus for dispensing and regulating a fluid substance from a first storage reservoir to a second storage reservoir, comprising:
   a) a main housing, comprising an upper housing portion and a lower housing portion;
   b) a fluid inlet passage configured to be connected to a source of fluid substance from said first reservoir present at said upper portion of said main housing;
   c) a fluid exit passage through which said fluid substance exits said apparatus;
   d) a bore housing attached to said main housing and disposed between said fluid inlet passage and said fluid exit, said bore housing comprising a bore;
   e) a central tower having a proximal end, a distal end, an outer wall, and a length dimension, said central tower being centrally-disposed on said bore housing at said proximal end, said central tower further comprising a passage extending therethrough that runs parallel to said length dimension, said passage of said central tower having a proximal end and a distal end, and at least one port passing through said outer wall in fluid communication with said passage of said central tower;
   f) a tilt valve having a head and a shank, said shank having a first end proximal to said head, and a second end distal thereto, said head being sealingly engaged over said proximal end of said passage of said central tower;

g) a needle valve disposed over said distal end of said central tower, said needle valve having a length dimension that runs parallel to said length dimension of said central tower;

h) a piston slidably disposed within said bore of said bore housing, said piston having an interior volume, a top portion and a bottom portion, said top portion of said piston comprising an orifice centrally-located therethrough, said orifice being dimensioned sufficiently to enable said needle valve to pass therethrough;

i) a dispensing lever pivotally connected to said main housing;

j) an actuator lever having a first end and a second end, wherein said first end of said actuator lever is pivotally connected to said dispensing lever and wherein said second end of said actuator lever is in mechanical contact with said second end of said shank of said tilt valve.

2. An apparatus according to claim 1 wherein said piston is mechanically biased towards a closed position with respect to said fluid inlet passage sufficiently to prohibit fluid communication between said fluid inlet passage and said fluid exit.

3. An apparatus according to claim 1 wherein said actuator lever is mechanically biased sufficiently to maintain said head of said tilt valve to be sealingly engaged over said proximal end of said passage of said central tower.

4. An apparatus according to claim 1 wherein said piston further comprises an upper shoulder portion, and a seal coextensively present about said upper shoulder, disposed sufficiently thereon to form a seal between said upper shoulder and said fluid inlet passage when said apparatus is in a state of non-use.

5. An apparatus according to claim 1 wherein said orifice has a diameter, said needle valve has an outer diameter, and wherein the outer diameter of said needle valve is smaller than the diameter of said orifice sufficiently to enable flow of liquid present at said fluid inlet passage to said interior volume of said piston.

6. An apparatus according to claim 1 wherein both of said fluid inlet passage and said fluid exit passage are conduits having a circular cross section and a center, wherein the centers of each of said fluid inlet passage and said fluid exit are substantially aligned with one another.

7. An apparatus according to claim 1 wherein said fluid inlet passage comprises a conduit that is rotatable in two dimensions.

8. An apparatus according to claim 1, wherein said tower further comprises a base, and wherein there is a check valve subassembly disposed within said passage.

9. An apparatus according to claim 8 wherein said check valve subassembly comprises a ball that is mechanically biased by a spring to be in a closed position with respect to said at least one port.

10. An apparatus according to claim 9 wherein said spring is of sufficient stiffness so as to not permit fuel to pass through said apparatus unless the pressure in said fluid inlet passage exceeds the ambient pressure by any amount within the range of between fifty pounds per square inch and one-hundred pounds per square inch.

\* \* \* \* \*